United States Patent [19]

Snell

[11] 4,193,262
[45] Mar. 18, 1980

[54] GAS TURBINE ENGINES
[75] Inventor: Leonard S. Snell, Bristol, England
[73] Assignee: Rolls-Royce Limited, GB2, United Kingdom
[21] Appl. No.: 874,758
[22] Filed: Feb. 3, 1978
[30] Foreign Application Priority Data
Feb. 24, 1977 [GB] United Kingdom ................ 7953/77
[51] Int. Cl.² .............................................. F02K 3/10
[52] U.S. Cl. ................................... 60/261; 60/39.16 S; 60/262; 60/263
[58] Field of Search ........... 60/39.16 S, 226 R, 226 B, 60/262, 263, 261

[56] References Cited
U.S. PATENT DOCUMENTS

| | | | |
|---|---|---|---|
| 2,751,168 | 6/1956 | Stalker | 60/226 R |
| 3,161,374 | 12/1964 | Allred et al. | 60/226 R |
| 3,255,584 | 6/1966 | Grieb | 60/263 |
| 3,333,793 | 8/1967 | Opfer et al. | 60/263 |
| 3,514,952 | 6/1970 | Schumacher et al. | 60/226 B |
| 3,810,360 | 5/1974 | Leibach | 60/263 |
| 3,867,813 | 2/1975 | Leibach | 60/226 R |
| 4,043,121 | 8/1977 | Thomas et al. | 60/262 |

FOREIGN PATENT DOCUMENTS

| | | | |
|---|---|---|---|
| 1099971 | 1/1968 | United Kingdom | 60/226 R |
| 1313841 | 4/1973 | United Kingdom | 60/226 R |
| 1443333 | 7/1976 | United Kingdom | . |

Primary Examiner—Carlton R. Croyle
Assistant Examiner—Edward Look
Attorney, Agent, or Firm—Stevens, Davis, Miller & Mosher

[57] ABSTRACT

A gas turbine engine power plant comprises a main gas turbine engine terminating in a jet pipe in which a free turbine is mounted. The free turbine is adapted to drive an auxiliary compressor. Means are provided such that a portion of the gas turbine engine efflux may be directed through the auxiliary turbine such that the auxiliary compressor augments the efflux from the main engine. Alternatively the entire gas turbine engine efflux may pass directly through the jet pipe.

8 Claims, 2 Drawing Figures

GAS TURBINE ENGINES

This invention relates to a gas turbine power plant, and relates more particularly to such power plant suitable for use for the propulsion of a supersonic aircraft.

The types of engine almost invariably used for the propulsion of aircraft which are designed to fly at speeds in excess of the speed of sound are the pure jet, or the low by-pass ratio engine. These engines are inherently much noisier than the higher by-pass ratio types of gas turbine engines however, because of the high velocity of the exhaust gases which is required for supersonic flight.

It is well known that amongst other things Airport regulations governing the maximum permissible noise level of aircraft have made jet engine noise suppression one of the most important fields of current aircraft engine research.

An object of the present invention is to provide a gas turbine power plant suitable for use in a supersonic aircraft, and which has a substantially reduced noise level during all low speed operating conditions.

According to the present invention, a gas turbine power plant comprises, a gas turbine engine terminating in a jet pipe, a free turbine disposed within the jet pipe, and connected to drive an auxiliary compressor situated in a flow passage externally of, but communicating with the jet pipe, flow diverting means selectively operable to direct the gas efflux of the gas turbine engine around said turbine and through the jet pipe, or alternatively to direct at least a portion of the gas efflux through the free turbine to drive it to produce a stream of compressed air from the auxiliary compressor.

The adjustable flow diverting means may comprise one or more pivotal flaps which in the first mode of operation prevent the efflux from the gas generator entering the free turbine, and in the second mode of operation allow the gas efflux to enter the free turbine. Alternatively the flow diverting means may comprise two butterfly valves.

The means for mixing the hot gas efflux and the compressed air may comprise a plurality of mixer chutes arranged downstream of the free turbine and, in addition, a plurality of reheat gutters may also be situated within or adjacent to the mixer chutes.

Preferably the gas turbine engine is situated under the forward portion of the wing of an aircraft and the auxiliary compressor is disposed in a flow passage within the wing structure. An aperture is provided in the upper surface of the wing, the aperture forming the intake of the auxiliary compressor during operation thereof.

Preferably when the auxiliary compressor is not in use the aperture forming the inlet of the air passageway for the auxiliary compressor is closed off.

The invention will now be more particularly described by way of example only and with reference to the accompanying drawings, in which.

Figure 1:
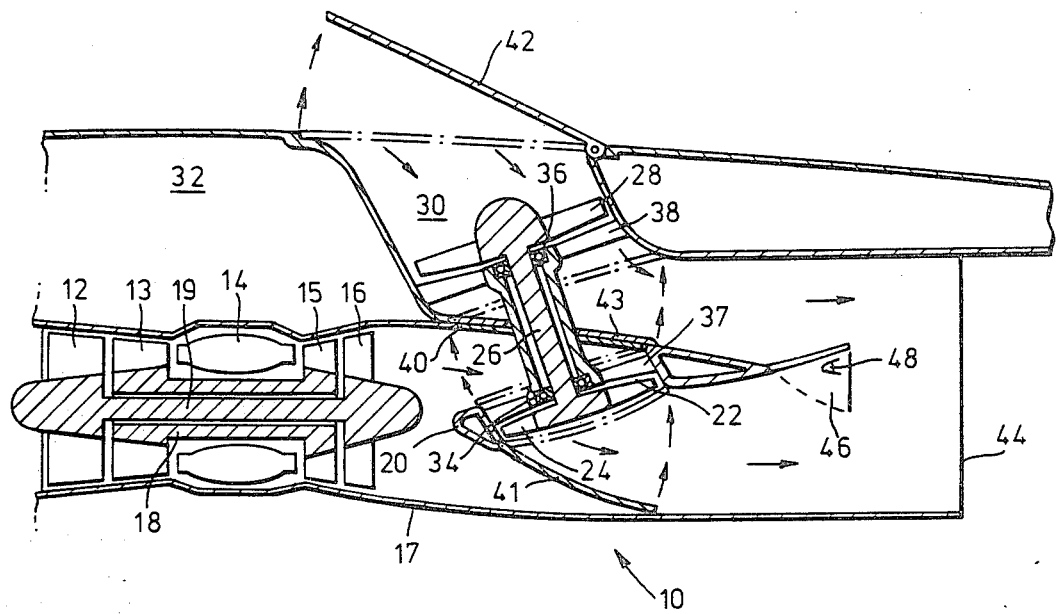
FIG. 1 shows a diagrammatic side elevation of one embodiment of a gas turbine power plant incorporating the present invention.

Referring to FIG. 1 of the drawings, a gas turbine engine power plant shown generally at 10 comprises a gas turbine engine of the pure jet type. The gas turbine engine consists of a low pressure compressor 12, a high pressure compressor 13, combustion equipment 14, a high pressure turbine 15, a low pressure turbine 16, and terminates in a jet pipe 17. The high and low pressure turbines 15 and 16, and the high and low compressors 12 and 13 are respectively secured to the rotatably mounted engine main shafts 18 and 19.

A splitter 20 is mounted transversely across the jet pipe 17. The splitter has a circular hole therethrough which is shaped to define a duct 22 for an auxiliary turbine 24. The turbine 24 is connected to a shaft 26 and drives an auxiliary compressor 28 mounted on the other end of the shaft. The compressor 28 is situated in a flow passage 30 formed in static structure, which in this example is the wing 32 of an aircraft on which the engine is mounted. The shaft 26 is supported in bearings 34 and 36 which are carried on guide vanes 37 and 38 which are mounted on the splitter 20 and the wing 32 respectively.

The splitter, and hence the duct 22 in which the turbine 24 is disposed, is angled with respect to the axis of the engine to allow the engine exhaust gases to be passed through or around the turbine with a minimum of disturbance to the flow and hence a minimum of loss of pressure. Flow diverting flaps 40, 41, 42 and 43 are connected to the splitter 20 and to the wing 32 and are pivotable by means not shown to cover and uncover the upstream and downstream ends of the duct 22 and the passage 30 respectively. The means for causing the pivoting of the flaps may be any convenient hydraulic, pneumatic, electrical or mechanical mechanism.

Operation of the power plant is as follows:

For supersonic operation of the aircraft when a high speed exhaust jet is required the valves 40, 41, 42 and 43 lie in the positions shown in the dotted lines in the Figure and close off both the entry and the exit to the duct 22 and the flow passage 30. In this mode of operation the hot gas exhaust from the turbine 16 flows around both sides of the splitter 20 and out through an exhaust nozzle 44 at the downstream end of the power plant.

For subsonic operation, particularly close to airfields where minimum noise is an important requirement, all the flap valves are moved to the open positions shown in the full lines in the figure. In these positions, valve 41 acts to block the lower part of the jet pipe while valves 40 and 43 overlie one another to prevent the hot exhaust gas from passing along the upper part of the jet pipe. The hot exhaust gas is thus directed through the turbine 24 to drive the compressor 28. The flap 42 is opened to allow the compressor to take in air from the upper surface of the wings 32 and by pivotting this flap at its downstream end it can be made to act as a scoop for directing air inwardly to the compressor.

Thus an additional mass flow is introduced into the jet pipe 17 which is much cooler and much slower moving than the hot exhaust gases and which, when mixed with the hot exhaust gases, produces a lower velocity exhaust jet and reduces the noise.

The mixing of the two hot and cold flows is achieved by mixer chutes 46 which in known manner direct the cold flow into the hot exhaust gases. If desired the mixer chutes 46 may incorporate reheat gutters 48 for burning more fuel in the mixed stream.

The flaps 41 need not make a gas tight seal with the jet pipe wall, but any leakage flow must be such that there still remains a significant pressure drop across the turbine 24. Similarly a small leakage flow may be allowed through the flaps 40 and 41 when in their closed position so that a small flow passes through the turbine to keep the shaft 26 rotating in the bearings 34 and 36 to minimize brinelling and other ill effects of the high operating temperature on the bearings.

The splitter 20 is made hollow so that it can be supplied with a cooling air flow from the engine or other available source, for example, spillage air from the gas turbine engine intakes which may flow through the static structure around the engine.

Since the shaft 26 passes through the flaps 40 and 43 it will be necessary to provide a sliding seal to maintain a seal around the shaft perimeter as the flaps are moved.

Figure 2:
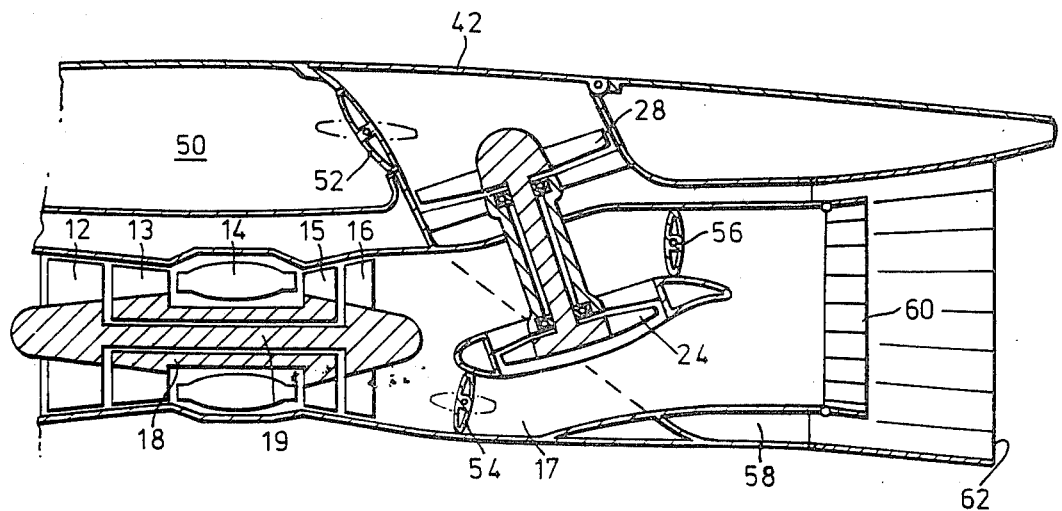
FIG. 2 shows a diagrammatic side elevation of an alternative embodiment of the present invention.

FIG. 2 shows an alternative embodiment of the invention. The basic elements of this embodiment are essentially the same and where they are identical the same reference numberals are used.

The main differences are as follows:

Some of the air for the compressor inlet is provided from the main engine itself or from its intake via a secondary air passage 50 and a butterfly valve 52, although a flap 42 in the aircraft wing is still provided.

The valves 40, 41 and 43 are changed to butterfly valves 54 and 56 and the output from the auxiliary compressor 28 is ducted around the jet pipe into an annular duct 58 so that the hot gas is completely surrounded by a cooler, slow-moving flow.

The jet pipe 17 which in this embodiment remains substantially cylindrical is now provided with a variable area nozzle 60 within the annular duct 58 which can be used to match the pressures in the duct 58 and the jet pipe 17 and also can effect some mixing of the two flows as they leave the nozzle. A second variable area nozzle 62 is disposed at the end of the duct 58 to vary the nozzle area between subsonic and supersonic conditions of operation.

The annular duct 58 may be defined by the power plant nacelle.

The above described power plant can be produced relatively simply by providing the fan and its turbine as a bolt-on module to an existing supersonic engine to improve the noise characteristics of the engine without resorting to a major re-design of the engine cycle.

I claim:

1. A gas turbine engine power plant comprising a gas turbine engine terminating in an elongate jet pipe which extends along a longitudinal axis, an air duct constructed to receive air and direct it to mix with an efflux of gases from the engine, an auxiliary compressor located in the air duct, a free turbine for driving the auxiliary compressor located in the jet pipe, flow diverter means selectively operable to direct the efflux of gases from the engine as desired through either of two paths, one path being through the free turbine to drive it and thereby produce a flow of compressed air from the auxiliary compressor, the other path circumventing the free turbine so that the free turbine is rendered inoperable independently of the engine, and a flow mixer means for mixing the air from the auxiliary compressor with the efflux of gases from the engine, the free turbine being mounted for rotation about an axis angled to the longitudinal axis of the jet pipe so that in its inoperative state, where the efflux of gases from the engine circumvents it, the free turbine presents a low profile and minimizes the disturbance to the flow of gases in the jet pipe.

2. A gas turbine power plant as claimed in claim 1 in which the flow diverter means comprises one or more pivotable flaps which in a first mode of operation prevents the efflux from the gas turbine engine entering the free turbine, and in a second mode of operation allows the gas efflux to enter the free turbine.

3. A gas turbine power plant as claimed in claim 1 in which the flow diverter means comprises two butterfly valves.

4. A gas turbine power plant as claimed in claim 1 in which the gas efflux and the compressed air are mixed by a plurality of mixer chutes arranged downstream of said free turbine.

5. A gas turbine power plant as claimed in claim 4 in which a reheat gutter means is situated within or adjacent to the mixer chutes.

6. A gas turbine power plant as claimed in claim 1 in which said plant is mounted under the forward portion of the wing of an aircraft and said auxiliary compressor is disposed within a flow passage within said wing structure.

7. A gas turbine power plant as claimed in claim 6 in which an aperture is provided in the upper surface of the wing, said aperture forming the intake of the auxiliary compressor during operation thereof.

8. A gas turbine power plant as claimed in claim 7 further comprising a pivotable flap selectively openable from and closable over said aperture so that when the auxiliary compressor is not in use the aperture forming the inlet to the auxiliary compressor is closed off by said flap.

* * * * *